United States Patent [19]
Silberberg

[11] Patent Number: 4,775,207
[45] Date of Patent: Oct. 4, 1988

[54] ELECTRO-OPTICAL SWITCH

[75] Inventor: Yaron Silberberg, Princeton Township, Mercer County, N.J.

[73] Assignee: Bell Communications Research, Inc., Livingston, N.J.

[21] Appl. No.: 26,639

[22] Filed: Mar. 17, 1987

[51] Int. Cl.$^4$ .................................................. G02B 6/14
[52] U.S. Cl. ................................. 350/96.14; 350/96.13
[58] Field of Search ........................... 350/96.14, 96.13

[56] References Cited

U.S. PATENT DOCUMENTS

| | | | |
|---|---|---|---|
| 4,127,320 | 11/1978 | Li | 350/96.15 X |
| 4,172,630 | 10/1979 | Burns et al. | 350/96.15 X |
| 4,196,964 | 4/1980 | Papuchon | 350/96.14 |
| 4,684,215 | 8/1987 | Shaw et al. | 350/96.15 X |
| 4,728,167 | 3/1988 | Soref et al. | 350/96.15 |
| 4,730,884 | 3/1988 | Seino et al. | 350/96.13 X |
| 4,741,586 | 5/1988 | Kim et al. | 350/96.15 |

FOREIGN PATENT DOCUMENTS 0097516  6/1982  Japan ............................... 350/96.13

OTHER PUBLICATIONS

"Electro-optic X-Switch Using Single-Mode Ti: LiNbO$_3$ Channel Waveguides", *Electronics Letters*, A. Neyer, vol. 19, No. 14, 7th Jul. 1983, pp. 553–554.

"Guided-Wave Devices for Optical Communications", *IEEE Journal of Quantum Electronics*, R. C. Alferness, vol. QE-17, No. 6, Jun. 1981, pp. 946–958.

"Polarization-Independent Optical Directional Coupler Switch Using Weighted Coupling", *Appl. Phys. Lett.* 35 (10), R. C. Alferness, 15 Nov. 1979, pp. 748–750.

"Optical-Waveguide Hybrid Coupler", *Optics Letters*, M. Izutsu, A. Enokihara, T. Sueta, Nov. 1982, vol. 7, No. 11, pp. 549–551.

*Primary Examiner*—John D. Lee
*Assistant Examiner*—Phan Heartney
*Attorney, Agent, or Firm*—James W. Falk

[57] ABSTRACT

An electro-optic switch implemented on a substrate which includes first and second input waveguides of unequal width and a central region in which light from the two input waveguides converge. First and second output waveguides are provided which diverge from the central region. Electrodes for generating an electric field are disposed adjacent the central region and output waveguides for switching a beam of light from the first to the second output waveguide in a step-like manner in response to a control voltage.

8 Claims, 2 Drawing Sheets

ELECTRO-OPTICAL SWITCH

BACKGROUND OF THE INVENTION

1. Field of the Invention

The invention relates to electro-optical switches, and in particular to switches which exhibit a step-like response to switching voltage.

2. Description of the Prior Art

The present invention relates to electro-optical switches for switching a beam of optical radiation between two waveguides on a substrate. Optical waveguides are typically fabricated from a pyroelectric material such as lithium niobate or lithium tantalate or from semiconductor materials such as gallium arsenide or indium phosphide. Wavepaths or waveguides are generally fabricated in the substance by depositing a dopant such as titanium on the surface of the substrate in the pattern desired for the wavepaths. The substrate is then heated to diffuse the dopant into the substrate. This procedure forms a wavepath or waveguide, i.e., a section in the pyroelectric material that guides light, usually about 3 to 10 $\mu$m wide. To permit logic operations, signal processing, or switching between wavepaths in the pyroelectric material, an electric field is imposed across the region of the crystal where a change in beam direction is desired. Such a field is generated by electrodes deposited on the substrate for this purpose. The field produces local changes in the optical polarizability of the crystal, thus locally changing the refractive index and, in turn, altering the path of light through the crystal.

In one form of integrated optics switch and modulator, known as a directional coupler switch, a pair of waveguides of refractive index greater than the surrounding substrate are provided in close parallel relationship to one another with electrodes provided thereon. Unfortunately, in many substances such as lithium niobate (LiNbO$_3$) and lithium tantalate (LiTaO$_3$) the modulators and switches so formed have proven to be polarization sensitive. For example, while light having a direction of polarization perpendicular to the substrate plane can be substantially modulated or switched, light with a polarization parallel to the substrate plane is simultaneously disadvantageously unaffected or relatively unaffected.

Switches in the form of directional couplers, preferably manufactured on a GaAs base or a LiNbO$_3$ base, and whereby the control arrangement essentially is formed by a single controllable DC voltage supply are disclosed in:

1. "Optical Waveguide Connecting Networks", H. F. Taylor, Electronics Letters, Vol. 10, No. 4, Feb. 21, 1974, pp. 41–43;
2. "Electro-Optic Y-Junction Modulator/Switch", Electronics Letters, Vol. 12, No. 18, Sept. 2, 1977, pp. 459–460;
3. "Experimental 4×4 Optical Switching Network", Schmidt et al, Electronics Letters, Vol. 12, No. 22, Oct. 28, 1976, pp. 575–577;
4. "Metal-Diffused Optical Waveguides in LiNbO$_3$", Schmidt et al, Applied Physics Letters, Vol. 25, No. 8, Oct. 15, 1974, pp. 458–460;
5. "A New Light Modulator Using Perturbation of Synchronism Between Two Coupled Guides", Tada et al, Applied Physics Letters, Vol. 25, No. 10, Nov. 15, 1974, pp. 561–562;
6. "GaAs Electro-Optic Directional-Coupler Switch", Campbell et al, Applied Physics Letters, Vol. 27, No. 4, Aug. 15, 1975, pp. 202–205;
7. "Electrically Switched Optical Directional Coupler: Cobra", Papuchon et al., Applied Physics Letters, Vol. 27, No. 5, Sept. 1, 1975, pp. 289–291;
8. "Electro-Optically Switched Coupler with Stepped DELTA Beta Reversal Using T$_i$-diffused LiNbO$_3$ Waveguides", Schmidt et al, Applied Physics Letters, Vol. 28, No. 9, May 1, 1976, pp. 503–506;
9. "Electrically Active Optical Bifurcation: BOA", Papuchon et al, Applied Physics Letters, Vol. 31, No. 4, Aug. 15, 1977, pp. 266–267.

Electro-optic switches are interferometric in nature, i.e., they require a precise phase shift to achieve a switched state with low crossstalk. The directional coupler switch, for example, requires a phase shift of 3" between its two waveguides to switch. Because of small fabrication errors, this phase shift requires slightly different voltages for each switching element in a switching array. It is also very difficult to obtain switching in the two orthogonal polarizations simultaneously.

Other electro-optical switches are described in:

1. "Guided-Wave Devices for Optical Communication", R. C. Alferness, IEEE Journal of Quantum Electronics, Vol. QE-17, No. 6, June 1981, pp. 946–958;
2. "Polarization-Independent Optical Directional Coupler Switch Using Weighted Coupling", R. C. Alferness, Appl. Phys. Lett. 35 (10), 15 Nov. 1979 pp. 748–750;
3. "Optical-Waveguide Hybrid Coupler," M. Izutsu, A. Enokihara, T. Sueta, Optics Letters, November 1982 Vol. 7, No. 11 pp. 549–551;
4. "Electrically Active Optical Bifurcation: BOA" M. Papuchon and A. M. Roy, Appl. Physics Letters, Vol. 31, No. 4 15 Aug. 1977, pp. 266–267;
5. "Digital-Controlled Electro-optic 1×2 Switch for Time-Division Multiplexing and Data Encoding", K. T. Koai and P. L. Liu, Applied Optics, Vol. 25, No. 22, 15 Nov., 1986, pp. 3968–3970; "4×4 Ti: LiNbO$_3$ Integrated Optical Crossbar Switch Array", L. McCaughan and G. A. Bogert, Appl. Phys. Lett., 47 (4), 15 Aug. 1985, pp. 248–350; The most useful switch by far has been the directional coupler switch. It has the following drawbacks:

1. It requires a precise voltage to define the switch states. This voltage may change slightly in time, and vary from device to device due to fabrication variations.
2. It usually operates only on one polarization state. It is very difficult (although demonstrated) to build a polarization insensitive directional coupler.
3. It is wavelength sensitive; it will operate satisfactorily only on a narrow wavelength range.
4. It is sensitive to fabrication tolerance. Some of this sensitivity may be removed by using a "delta beta reversal" switch (Reference 8) at the price of having to control a voltage source for precise switching.

Other switches suffer from similar problems. The proposal to synthesize a switch which will have a digital response has also been made. This synthetic switch is very complicated and still has many drawbacks. Prior to the present invention, there has not been a switch which is simultaneously:

1. Insensitive to switching voltage variations. (This makes this switch particularly attractive for use in switch arrays where a single voltage source can be used.)

2. Insensitive to fabrication variations.

3. Provides simultaneous switching of two orthogonal polarization components.

4. Permits operation over a broad wavelength range.

SUMMARY OF THE INVENTION

Briefly, and in general terms, the invention provides an electrically controlled electro-optical switch having a step-like response to the switching voltage.

Electrodes are disposed on the substrate and are responsive to a control voltage applied thereto for producing an electrical field so that the velocity of the optical radiation propagated in the waveguides is affected and the direction of the propagation of the optical radiation is switched from the first output waveguide to the second output waveguide in a step-like manner as a function of time and the control voltage applied to the electrodes.

DESCRIPTION OF THE PREFERRED EMBODIMENT

Most of the switches demonstrated or proposed in integrated optics are very different from their electronics counterpart in their response. While an electronic switch has a sharp step-like response to the switching voltage, all integrated optics switches show a varying response, where "pure" switched states are obtained only at very specific values of the applied voltage. For example, in a directional coupler switch, switching is obtained at two distinct voltages $V_0$ and $V_1$. This requires precise control of the voltage, and in practice the exact switching voltage is expected to vary from device to device due to process variations. A "digital" switch would ideally have two switched states which are not sensitive to the exact voltage. The present invention provides such a switch in integrated optics by using an asymmetric x-junction or 2×2 structure. For integrated optics a step-like response eliminates the need for precise voltage control for switching and permits the operation of many such elements by a single voltage source, such as required for switching arrays. Moreover, because such characteristics should apply to both polarizations in a LiNbO$_3$ device, the switch can be made polarization independent.

The device according to the present invention is based on an asymmetric waveguide junction structure, composed from two input guides of unequal width, a double-moded central region and a symmetric output branching.

An asymmetric waveguide branching is known to perform mode sorting. The fundamental or first order mode of the central region can be excited by launching light through the wider or the narrower input guides, respectively. The input guides have different widths so they excite different normal modes at the two-mode region of the junction. An electric field applied to the otherwise equal output branches generate the required asymmetry to guide each of the modes to a different output waveguide. The advantage of such a design is that the switching response is improved with an increasing asymmetry, and therefore one obtains a step-like response as is required from a digital switch.

The symmetry of the output branching is broken by the external electric field. These modes can now be routed to the required output guide by properly biasing the output branching. The fundamental mode will be directed to the arm with higher index of refraction. Due to the symmetry breaking operation, switching is not periodic or quasiperiodic, but depends only on the direction of the bias.

The switching response can be used to generate a polarization independent switching in Ti:LiNbO$_3$. In common x- or z-cut LiNbO$_3$ devices one polarization is affected by an electro-optic interaction which is three times weaker than the other polarization. It is obvious that in a switch with the above response both polarizations can be switched by a strong enough bias.

DETAILED DESCRIPTION

Figure 1:
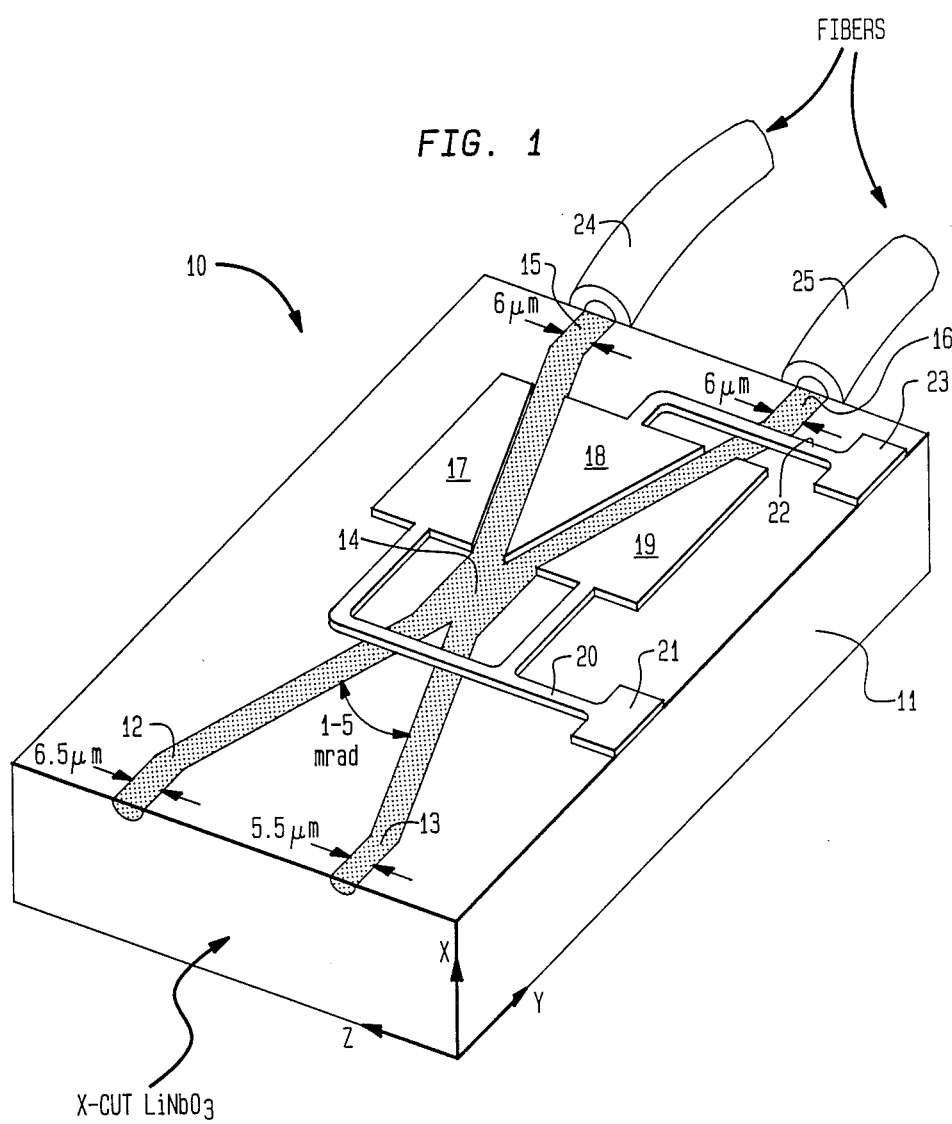
FIG. 1 depicts a specific illustrative embodiment of applicant's invention implemented in x-cut lithium niobate.

FIG. 1 shows a schematic layout of the proposed switch. It is composed of a waveguide junction with two input guides of different width converging into the junction and two identical guides diverging out of it. An external electrical field can be applied using the electrode structure. Switching is accomplished by biasing the symmetric output branch so that the refractive index of one guide is increased and that of the other guide is decreased. Light from the wider input waveguide will be routed to the output guide with the higher index of refraction. A calculation of light output as a function of the induced index difference, (which is proportional to the strength of the applied field), can be made demonstrating a step-like response.

Such a structure is directly implementable in x-cut lithium niobate shown in FIG. 1 through the established technology of waveguide fabrication by titanium indiffusion. For a switch to operate at the important wavelength range of 1.3-1.5 micrometers the waveguide width should be in the range of 5-10 microns. For proper operation the angle between the waveguides should be of the order of 1-5 milliradians. A smaller angle will make the switch longer, but requires smaller electric fields for switching. The electrodes can be either evaporated or electroplated and may be of gold, but a number of other metals can be used as well.

Figure 2:
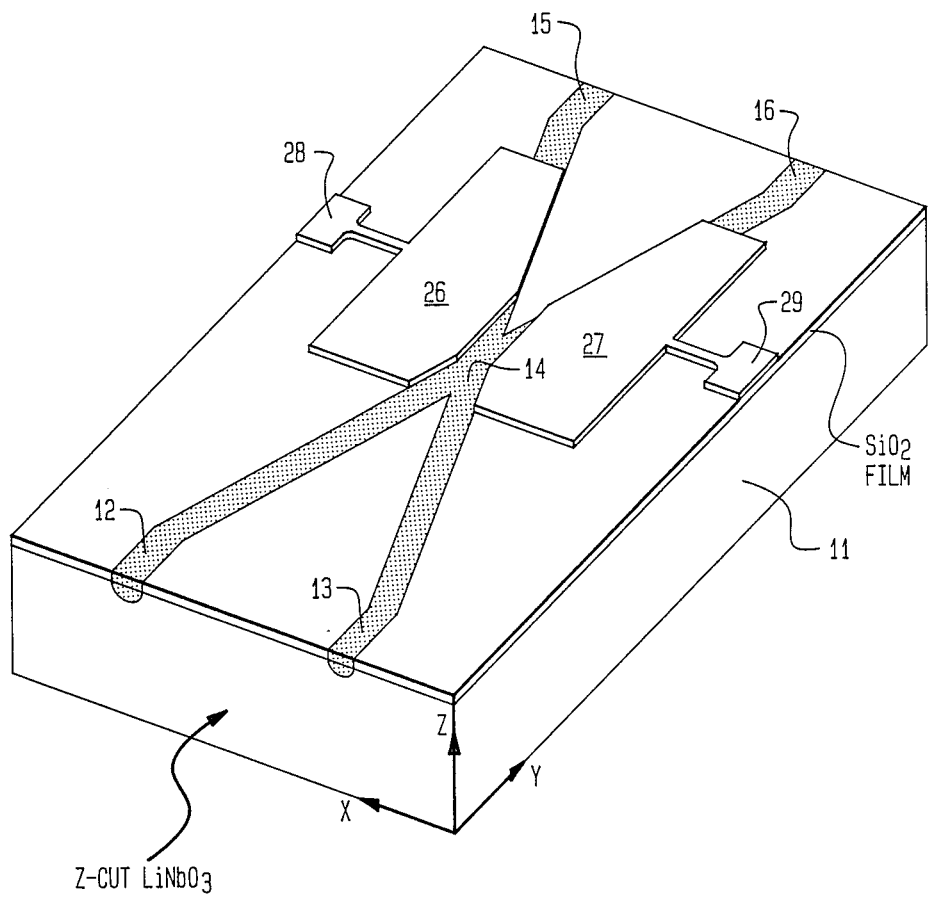
FIG. 2 shows another such embodiment implemented in z-cut lithium niobate.

The same design, with a minor change, can be implemented also in z-cut lithium niobate as will be shown in FIG. 2. The change required is in the shape of the electrode pattern.

Turning to FIG. 1, there is shown a perspective view of a substrate on which the electro-optical switch 10 according to the present invention can be implemented. More particularly, the Figure depicts a substrate 11 composed of x-cut or lithium niobate. (The drawing shows an x-cut LiNbO$_3$ geometry.) A first waveguide 12 and a second waveguide 13 are providd on the substrate 11. The first waveguide 12 preferably has a width of 6.5 microns while the second waveguide 13 preferably has a width of 5.5 microns. Although the preferred embodiment shows converging waveguides with different widths, they may alternatively be different in some other parameter leading to different propagation velocity of the guided light. For example the two converging guides may be identical in all respects but can be made different by properly biasing them with an electric field.

The waveguides 12 and 13 are normally spaced from one another on the substrate 11, but approaching the central region 14 the waveguides 12 and 13 are arranged to converge at an angle between one and five milliradians. The waveguides 12 and 13 converge at the central region 14 in which light from both the first 12 and second 13 waveguides propagate. The central region 14 forms a waveguide junction, supporting two modes. An electric field can be applied along all or some of these input and output waveguides through properly placed electrodes, so that light from the converging input waveguides 12 and 13 can be switched between the two diverging output waveguides 15 and 16.

Alternatively, in another embodiment a structure may be provided in which the input side is composed only of one waveguide which then splits into the two diverging waveguides. The electric field is applied to one or both of the diverging guides. (This is known as a 1×2 switch).

In the preferred embdiment, a first output waveguide 15 and a second output waveguide 16 are provided on the surface of the substrate 11; the output waveguides are spaced from one another but are connected to and diverge from the central region 14. The width of the first output waveguide 15 is preferably 6 microns while the width of the second waveguide is also preferably 6 microns.

There is further provided means for generating an electrical field composed of electrodes disposed on the surface of the substrate adjacent the central region 14. More particularly, the present invention provides a first electrode consisting of a first portion 17 and a second portion 19 which are electrically connected by means of a bus line 20 which is connected to a pad 21 on the surface of the substrate. A second electrode 18 is also provided which is disposed on the surface of the substrate adjacent to the central region 14. The second electrode 18 is connected to a bus 22 which is in turn connected to a pad 23 on the surface of the substrate. An electrical potential may then be provided to the electrodes on the substrate by means of wires which may be connected to pads 21 and 23 according to wire bonding techniques known in the art.

The electrode 17, consists of a trapezoidal-shaped structure having one edge running parallel to the length of the first output waveguide 15. The second portion 19 of the first electrode also consists of a trapezoidal-shaped structure having one edge running parallel to and along the length of the second output waveguide 16.

The second electrode 18 preferably consists of a triangularly-shaped layer having one edge disposed along the length of the first output waveguide 15 and a second edge disposed along the length of the second output waveguide 16. The edge of the first electrode 17 adjacent the output waveguide 15 is spaced apart and parallel to the edge of the second electrode 18, also, extending along the length of the waveguide 15. The edge of the second portion of the electrode 19 is spaced apart and runs parallel to the edge of the second electrode 18 which extends along the length of the waveguide 16.

The first and second output waveguides 15 and 16 may be coupled to similar switches 10 or other elements in an integrated optic circuit. Alternatively, the output waveguides 15 and 16 may be directly attached to optical fibers 24 and 25 respectively, such as shown in a highly diagramatic fashion in the Figure.

Turning next to FIG. 2, there is shown an alternative embodiment of the present invention which is implemented on a substrate consisting of z-cut lithium niobate. The Figure shows a first input waveguide 12 and a second input waveguide 13 converging into a central region 14 such as that depicted in FIG. 1. A first output waveguide 15 and a second output waveguide 16 are also shown diverging from the central region 14 as depicted in the first embodiment. The width and other characteristic of such waveguides for such second embodiment are similar to that shown in the first embodiment and need not be described in detail here. The configuration of electrodes in the second embodiment is somewhat different. The first electrode 26 consists of a plate having an edge portion extending along a portion of the first input waveguide 12, a portion of the central region 14 and over a portion of the output waveguide 15. The first electrode 26 is connected to a pad 28 for receiving a dc electric signal from external to the substrate. The second electrode portion 27 which is connected to a pad 29, consists of a plate disposed on the substrate including a portion extending at the edge of the central region 14 and over the second output waveguide as it diverges from the central region 14.

The electrodes are disposed over a silicon dioxide or some other transparent layer, in order to optically isolate them from the waveguides. My invention can be implemented in other electro-optic integrated optics material such as GaAs, InP etc. It is also important to note that a number of variations on the above structure may be conceived without affecting its basic operation. For example, the electrodes can operate on only one of the output guides. The input and output sides of the switch can be interchanged, and in another version both the input and the output may be acted upon by electric field. My invention covers all these and other possible variations.

An integrated electro-optic switch as this one should find application in future optical networks where direct switching of the optical signal will be required. This switch is likely to be an element in a switch array which can handle a large number of input channels.

An integrated electro-optic switch as this one should find application in future optical networks where direct switching of the optical signal will be required. This switch is likely to be an element in a switch array which can handle a large number of input channels.

While the invention has been illustrated and described as embodied in electro-optical switch, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that from the standpoint of prior art, fairly constitute essential characteristics of the generic or specific aspects of this invention, and, therefore, such adaptations should and are intended to be comprehended within the meaning and range of equivalence of the following claims.

What is claimed is:
1. An electro-optical switch comprising
  a substrate having first and second input optical waveguides that converge to a central region from which first and second output optical waveguides diverge, said central region being capable of supporting two different optical modes, said first and second input waveguides each being characterized by a different propagation velocity for optical signals and each responsive to input optical signals for propagating the signals to said central region to respectively excite therein one of said two different optical modes, said first and second output waveguides each being quiescently characterized by the same propagation velocity for optical signals, and means for changing the propagation velocity of said first and second output waveguides with respect to each other to direct any excited signals of one mode to propagate in one of the output waveguides and to direct any excited signals of the other mode to propagate in the other one of the output waveguides.

2. A switch as in claim 1 wherein said means for changing comprises electrodes for applying an electric field to said first and second output waveguides to cause the propagation velocity of one of said output waveguides to increase while at the same time causing the propagation velocity of the other one of said output waveguides to decrease.

3. A switch as in claim 2 wherein only the fundamental mode is excited in said central region in response to optical signals propagated in one of said input wavegudes and only the first-order mode is excited in said central region in response to optical signals propagated in the other one of said input waveguides.

4. A switch as in claim 3 wherein said first and second input waveguides have different widths.

5. A switch as in claim 4 wherein only the fundamental mode is excited in said central region in response to optical signals propagated in said wider input waveguide and only the first-order mode is excited in said central region in response to optical signals propagated in said narrower input waveguide.

6. A switch as in claim 5 wherein said substrate comprises x-cut lithium niobate.

7. A switch as in claim 5 wherein said substrate comprises z-cut lithium niobate.

8. An electro-optical switch comprising
a substrate having a waveguiding pattern,
said patten including two input optical-signal-propagating waveguides respectively characterized by different propagation velocities and converging to a double-moded central region from which diverge two output optical-signal-propagating waveguides respectively characterized by the same propagation velocity,
and means for changing the respective propagation velocities of said output waveguides sufficiently from each other to cause optical signals of one mode to be directed from said central region only to the output waveguide having the higher propagation velocity and to direct optical signals of the other mode from said central region only to the output waveguide having the lower propagation velocity.

* * * * *

UNITED STATES PATENT AND TRADEMARK OFFICE
CERTIFICATE OF CORRECTION

PATENT NO. : 4,775,207

DATED : October 4, 1988

INVENTOR(S) : Yaron Silberberg

It is certified that error appears in the above-identified patent and that said Letters Patent is hereby corrected as shown below:

Column 2, line 17, change "3"" to --$3\pi$--.

Signed and Sealed this

Eighth Day of September, 1992

Attest:

DOUGLAS B. COMER

Attesting Officer     Acting Commissioner of Patents and Trademarks